United States Patent
Ramegowda et al.

(10) Patent No.: US 11,982,997 B2
(45) Date of Patent: May 14, 2024

(54) REAL-TIME OPERATION OF AN INDUSTRIAL FACILITY USING A MACHINE LEARNING BASED SELF-ADAPTIVE SYSTEM

(71) Applicant: HONEYWELL INTERNATIONAL, INC., Morris Planes, NJ (US)

(72) Inventors: Yogesha Aralakuppe Ramegowda, Bengaluru (IN); Pachipulusu Lingesh Sumanth, Bengaluru (IN); Srikanth Olety Subramanya, Bengaluru (IN); Parag Ravindra Rao, Bengaluru (IN); Koyalkar Raman Kishore, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 747 days.

(21) Appl. No.: 16/586,920

(22) Filed: Sep. 28, 2019

(65) Prior Publication Data
US 2021/0096547 A1    Apr. 1, 2021

(51) Int. Cl.
*G05B 19/41* (2006.01)
*G05B 13/02* (2006.01)
(Continued)

(52) U.S. Cl.
CPC ... *G05B 19/41865* (2013.01); *G05B 13/0265* (2013.01); *G06Q 10/0631* (2013.01); *G05B 2219/33034* (2013.01)

(58) Field of Classification Search
CPC .................................................. G05B 19/41
See application file for complete search history.

(56) References Cited

U.S. PATENT DOCUMENTS 6,370,515 B1   4/2002   Diamond et al.
7,035,767 B2   4/2006   Archer et al.
(Continued)

FOREIGN PATENT DOCUMENTS

WO    WO-2013108211 A1 *   7/2013   ......... G06Q 10/0631

OTHER PUBLICATIONS

Antoine Charles Jean Jonquais and Florian Krempl, Predicting Shipping Time with Machine Learning, Massachusetts Institute of Technology, Jun. 2019. (Year: 2019).*
(Continued)

*Primary Examiner* — Kurtis Gills
(74) *Attorney, Agent, or Firm* — Paschall & Associates, LLC; James C. Paschall; Anthony Miologos

(57) ABSTRACT

The disclosure provides a method and system of improvement in the real-time operation of a terminal station in an industrial facility using a machine learning-based self-adaptive system comprising obtaining real-time operations data and historical data stored in a local database or at a cloud-storage. The data relates to input parameters of the terminal station. The method includes inputting the input parameter to a machine learning configurable module of the machine learning-based self-adaptive system and analyzing the input parameter using dynamic machine learning models and algorithms to identify patterns to each of the input parameters. The method further includes evaluating the identified pattern against the real-time operations data obtained from the terminal station and predicting at least one output parameter based on the input parameter and the identified pattern against the real-time operations. Based on the prediction, adjusting the output parameter of the real-time operations data.

15 Claims, 6 Drawing Sheets

(51) Int. Cl.
*G05B 19/418* (2006.01)
*G06Q 10/0631* (2023.01)

(56) References Cited

U.S. PATENT DOCUMENTS

| | | | |
|---|---|---|---|
| 8,374,898 B2 | 2/2013 | El-Bakry et al. | |
| 9,911,096 B2 | 3/2018 | Desai et al. | |
| 2008/0077368 A1* | 3/2008 | Nasle | G05B 17/02 703/4 |
| 2014/0058775 A1* | 2/2014 | Siig | G06Q 10/06 705/7.12 |
| 2014/0229399 A1* | 8/2014 | Ranganathan | G06Q 10/083 705/337 |
| 2016/0042321 A1* | 2/2016 | Held | G06Q 10/08355 705/338 |
| 2016/0196527 A1* | 7/2016 | Bose | G06Q 10/0832 705/332 |
| 2017/0046658 A1* | 2/2017 | Jones | H04W 4/02 |
| 2017/0262790 A1* | 9/2017 | Khasis | G08G 1/012 |
| 2017/0344909 A1* | 11/2017 | Kurokawa | G05B 23/024 |
| 2018/0060808 A1* | 3/2018 | Borgerson | G06Q 40/04 |
| 2018/0158020 A1* | 6/2018 | Khasis | G01C 21/343 |
| 2018/0349849 A1* | 12/2018 | Jones | G06Q 10/08345 |
| 2019/0050810 A1 | 2/2019 | Nagalla et al. | |
| 2019/0052453 A1 | 2/2019 | de Ligt | |
| 2019/0130709 A1 | 5/2019 | Rahut et al. | |
| 2020/0017117 A1* | 1/2020 | Milton | G08G 1/0137 |

OTHER PUBLICATIONS

Fotuhi et al: "Modeling yard crane operators as reinforcement learning agents", Research in Transportation Economics, vol. 42, No. 1, Jun. 2013 (Jun. 2013), pp. 3-12, XP055767494, Amsterdam, NL ISSN: 0739-8859, DOI: 10.1016.
Search Report for corresponding EP Application No. 20197320.3.

* cited by examiner

REAL-TIME OPERATION OF AN INDUSTRIAL FACILITY USING A MACHINE LEARNING BASED SELF-ADAPTIVE SYSTEM

TECHNICAL FIELD

The present disclosure relates generally to industrial process control and automation systems that automate the operation of one or more bulk fuel terminal stations such as cargo distribution terminals, oil and gas distribution terminals or other fuel product distribution terminals. More specifically, the present disclosure relates to an improved automation system for the real-time operation of the bulk fuel terminal station in an industrial facility using a machine learning based self-adaptive system.

BACKGROUND

Generally, the movement of fuel and/or petrochemical products from one location to another often involves the storage, loading or unloading of the products at specialized bulk fuel terminals that are constructed for handling of the products. The bulk fuel terminals are often found in ports, rail terminals and product manufacturing facilities where the products are loaded and off-loaded from bulk transportation methods including marine vessels, rail wagons, road tankers or pipelines. The bulk fuel terminals typically employ storage tanks located either above ground or below ground, and gantries/bays for loading the products into road tankers, or other specialized fuel transportation vehicles including rail wagons, marine vessels and pipelines. Bulk fuel terminals are also situated close to oil refineries that are serviced by pipelines from which they either draw their supplies or feed into the pipeline network their products.

During transportation bulk fuel terminals stations often struggle with significant bottlenecks due to the frequent arrival and departure of fuel transport vehicles and a limited number of loading/unloading bays. This results in long idle periods for transport vehicles waiting to load or unload their fuel products, severely impacting the operational efficiency of the terminal and its revenue generation.

Conventional terminal automation systems are designed to manage and schedule the loading and unloading of bulk fuel cargo from numerous cargo transporting vehicles. For terminals that operate on a continuous basis or handle costly fuel, a small improvement in efficiency can have a significant impact on revenue. For example, if we consider an oil terminal that handles the loading of 500 trucks per day with an average of 7 thousand gallons (~32 thousand liters) per truck and $2.5 per gallon, this would amount to daily sale of $8.8 Million. Even a 1% improvement in terminal operations would result in an increase in sale by 88 thousand Dollar per day.

This disclosure provides an improved automation system for the real-time operation of a bulk fuel terminal station in an industrial facility to improve terminal efficiency and reduce revenue loss.

SUMMARY

Various embodiments are disclosed to improve the real-time operation of bulk fuel terminal stations in an industrial facility using a machine learning-based self-adaptive system.

In accordance with an exemplary embodiment, a method for improving the real-time operation of at least one bulk fuel terminal station in an industrial facility using a machine learning-based self-adaptive system comprises obtaining, from the at least one bulk fuel terminal station, data comprising real-time operations data and historical data stored in a local database or at a cloud-storage, the data relating to at least one input parameter of a bulk fuel terminal operation of the at least one bulk fuel terminal station. Inputting the at least one input parameter to a machine learning configurable module of the machine learning-based self-adaptive system. The machine learning module analyzes the at least one input parameter using dynamic machine learning models and algorithms to identify at least one pattern for each of the at least one input parameter. Evaluating the at least one identified pattern against at least one output parameter of the real-time operations data obtained from the at least one bulk fuel terminal station, and predicting at least one output variable based on the at least one input variable and the at least one identified pattern to the at least one input parameter during real-time operations, and adjusting the at least one output parameter of the real-time operations data based on the at least one predicted output variable.

In accordance with an exemplary embodiment, a non-transitory machine-readable medium encoded with instructions that, when executed, cause at least one processing device to improve the real-time operation of at least one terminal station in an industrial facility using a machine learning-based self-adaptive system. The at least one processing device obtains from the at least one terminal station, data comprising real-time operations data and historical data stored in a local database or at a cloud-storage, the data relating to at least one input parameter of the at least one terminal station, and input the at least one input parameter to a machine learning configurable module of the machine learning-based self-adaptive system. The machine learning configurable module analyzes the at least one input parameter using dynamic machine learning models and algorithms to identify at least one pattern to each of the at least one input parameter. Evaluating the at least one identified pattern against the real-time operations data obtained from the at least one terminal station to predict at least one output parameter based on the at least one input parameter and the at least one identified pattern against the real-time operations and adjust the at least one output parameter of the real-time operations data.

In accordance with another exemplary embodiment, a machine learning-based self-adaptive system for improving the real-time operation of at least one terminal station in an industrial facility includes: a memory device arranged to receive and store real time operations data from a sensor data aggregation node, the real time operations data relating to at least one input parameter of the at least one terminal station. A database containing historical data obtained from the sensor data aggregation node, the historical data relating to the at least one input parameter of the terminal operation of the at least one terminal station. A machine learning module including one or more processors, the machine learning module coupled to the memory device and database and arranged to obtain the real-time operations data from the memory device and the historical data from the database for processing by the one or more processers, the one or more processors configured to: input the at least one input parameter to the machine learning module of the machine learning-based self-adaptive system, analyze the at least one input parameter by the machine learning configurable module using dynamic machine learning models and algorithms to identify at least one pattern to each of the at least one input parameter, evaluate the at least one identified pattern against the real-time operations data obtained from the at least one terminal station, predict at least one output parameter based on the at least one input parameter and the at least one identified pattern against the real-time operations, and adjust the at least one output parameter of the real-time operations data.

These and other features, aspects, and advantages of the present disclosure are further explained by the following detailed description, drawing and appended claims.

BRIEF DESCRIPTION OF THE DRAWING

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present disclosure are by way of illustration only and should not be construed in any way to limit the scope of the disclosure. Those skilled in the art will understand that the principles of the disclosure may be implemented in any type of suitably arranged device or system.

Figure 1:
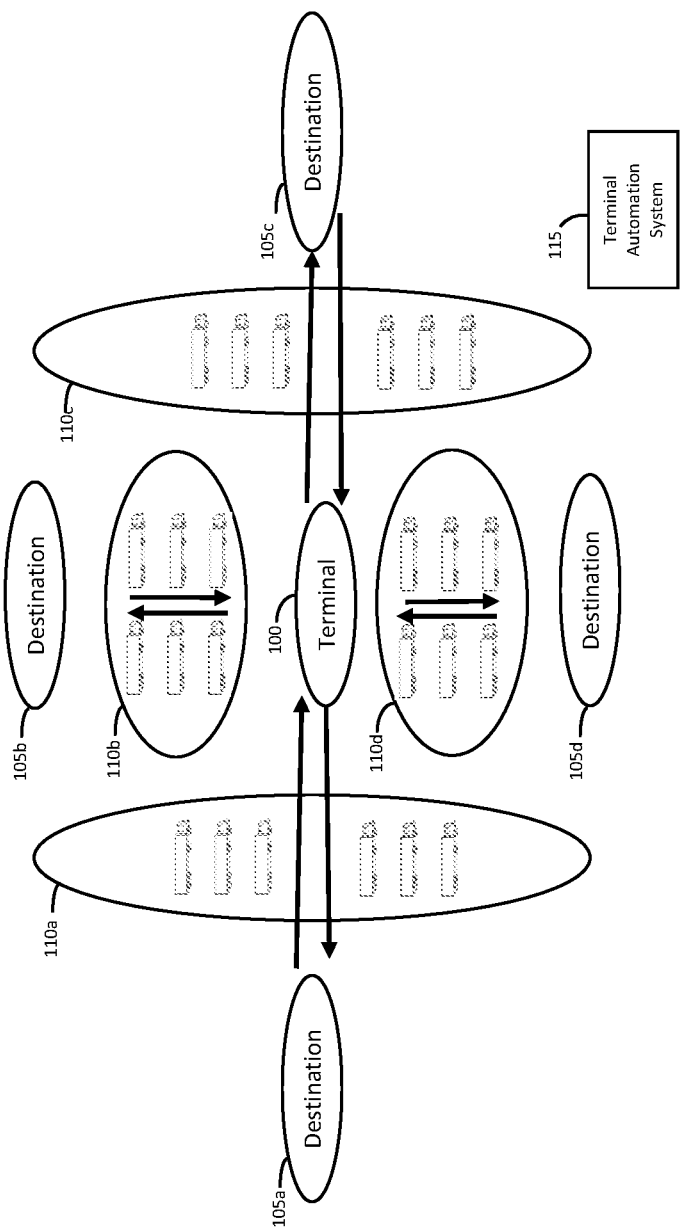
FIG. 1 illustrates an example of a cargo distribution terminal that receives cargo from or provides cargo to a number of cargo vehicles in accordance with this disclosure.

FIG. 1 illustrates an example cargo distribution terminal 100 that receives cargo from or provides cargo to a number of cargo vehicles in accordance with this disclosure. The terminal 100 generally represents any suitable terminal used to receive, store, and distribute one or more products, where the one or more product can be petroleum products. The terminal 100 receives shipments of cargo from or provides cargo to a number of cargo vehicles, such as trucks, for delivery to or from a number of destinations 105a-105d. The cargo vehicles may be associated with different carrier companies 110a-110d.

In many cases, it is difficult for carrier companies 110a-110d to plan the time that their vehicles are to visit a terminal for cargo loading or unloading. Due to the lack of ability to schedule in some cases, the vehicles simply arrive at the terminal go through tare weight and laden weight plates at appropriate locations in the terminal and wait for an available cargo bay. The vehicles are usually admitted on a first-come, first-served basis. This may result in a large backlog of vehicles waiting outside the terminal.

Likewise, some terminals are not able to inform the carrier companies 110a-110d or vehicles when issues arise with the availability of a product or a maintenance issue at one of the cargo bays at the terminal. Due to a significant amount of manual "on-the-fly" operations, some terminals do not have much flexibility to reschedule deliveries when disturbances occur in their planning. This also may result in queuing outside the bay areas or the terminal.

To mitigate the backlog, some terminals invest significant financial and personnel resources in solutions including:
  public display boards, similar to those found at airports, that direct vehicles into the terminal for loading or unloading;
  cargo load offices staffed with personnel to monitor the vehicles arriving and departing;
  technology, including data entry terminals (DETs) and card readers, to record each operator or vehicle upon arrival;
  logistical planning for each cargo bay; and
  printers and infrastructure required for printing of filling advisory notes (FANs) and bills of lading (BOLs). A FAN informs a vehicle operator as to which cargo bay at the terminal that cargo will be filled or loaded onto a vehicle.

Each of these solutions has its own disadvantages. For example, the hardware platforms for the DETs and card readers often need to be regularly maintained and upgraded, which can require service contracts with multiple vendors to safeguard the investments made for the infrastructure. Logistical planning tends to be very time consuming and error prone. Printers are subject to failures, resulting in a larger backlog of vehicles outside the terminal.

To help resolve these issues, a terminal automation system (TAS) 115 is provided for use with a cargo terminal 100. The TAS 115 can be installed at the terminal 100, or the TAS 115 can be installed remotely as a server accessible over a network. The TAS 115 features a slot booking system configured to provide an optimal arrangement of time slot assignments. The TAS 115 can be used in conjunction with mobile technology, such as applications loaded onto operators' mobile phones. The TAS 115 can also be used in conjunction with electronic forms, including digitally-signed FANs and BOLs.

In this disclosure, reference may be made to the cargo vehicles as trucks and to vehicle operators as drivers. However, this disclosure is not limited to use with cargo terminals that receive and provide cargo to trucks. The principles disclosed here are applicable to terminals that operate with other cargo-transporting vehicles, such as trains, aircraft, or sea craft. Accordingly, "operators" of vehicles include drivers, pilots, engineers, captains, and the like. Likewise, "terminals" include truck terminals, airports, sea ports, rail yards, and the like.

Figure 2:
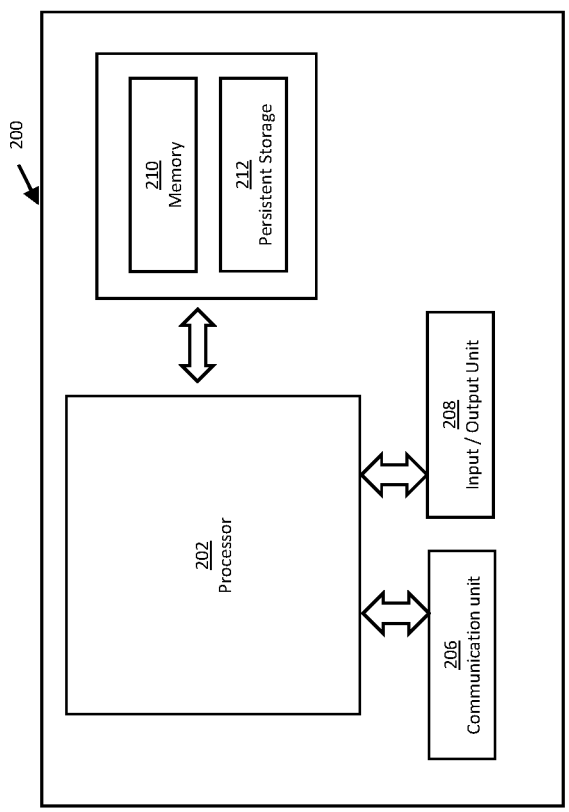
FIG. 2 illustrates an example device supporting machine learning-based self-adaptive system in accordance with this disclosure.

FIG. 2 illustrates an example device 200 supporting machine learning-based self-adaptive system in accordance with this disclosure. The device 200 includes at least one processor 202, at least one storage device 204, at least one communications unit 206, and at least one input/output ("I/O") unit 208. Each processor 202 can execute instructions may be loaded into a memory 210. For example, the instructions can implement various functions described in this document for using the machine learning-based self-adaptive system. Each processor 202 denotes any suitable processing device, including one or more microprocessors, microcontrollers, digital signal processors, application specific integrated circuits ("ASICs"), field programmable gate arrays ("FPGAs"), or discrete circuitry.

The memory 210 and a persistent storage 212 are examples of storage devices 204, which represent any structure(s) capable of storing and facilitating retrieval of information including data, program code, and/or other suitable information on a temporary or permanent basis. The memory 210 may represent a random-access memory or any other suitable volatile or non-volatile storage device(s). The persistent storage 212 may contain one or more components or devices supporting longer-term storage of data including a read only memory, hard drive, flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 108 may provide a connection for user input through a keyboard, mouse, keypad, touchscreen, or other suitable input device. The I/O unit 108 may also send output to a display, printer, or other suitable output device.

Although FIG. 2 illustrates one example of a device 200 supporting machine learning-based self-adaptive system to improve the real-time operation of at least one terminal station in an industry facility, various changes may be made to FIG. 1. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
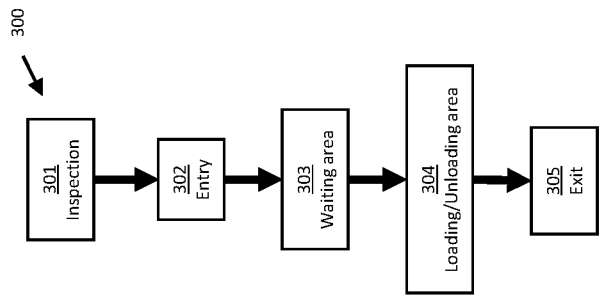
FIG. 3 illustrates an example for the movement of fuel and/or petrochemical products and the loading or unloading of cargo at bulk fuel terminals in accordance with this disclosure.

FIG. 3 illustrates an example of general terminal management process 300 in accordance with this disclosure. In step 301, an inspection officer at the inspection office of cargo distribution terminal conducts a physical inspection of the vehicle and the driver where the inspection officer examines and notes the details including a type of fuel product carrying, a vehicle type and other driver information. In step 302, the vehicle driver provides an access ID or RFID using a data entry terminal of a terminal automation system at the entry gate to enter the terminal facility. The data entry terminal prevents an unauthorized access. In step 303, once the vehicle enters the terminal facility, it is held in a bay waiting area for bay allocations and assignment to the next available bay. During bay allocation, there might be delay based on occupancy of each bay. In step 304, a batch controller controls the loading/unloading area of products in tanks which keeps track of the amount of product being loaded/unloaded into/from the vehicle in cargo distribution terminals. In step 305, once the fuel product loaded/unloaded, before the exit, the vehicle driver collects a bill of lading and exits the terminal facility.

The terminal facility can include warehouses, ports, or storage terminals which typically can receive cargo from and deliver cargo to many different transporting vehicles, such as trucks, trains, or ships. Due to frequent arrivals and departures of many disparate transporting vehicles and a limited number of cargo bays, some distribution terminals have deployed terminal automation systems, such as TAS 115 to manage and schedule the loading and unloading of cargo.

Terminal owners and operators may rely heavily on the trust and transparency built among multiple stakeholders including shareholders, terminal owners, terminal operators, carrier companies, drivers, and terminal customers. Currently, different stakeholders have different systems and databases at every stage with no automated synchronization across these systems. Manual interactions between parties make the supply chain less efficient and result in higher operational costs.

As particular examples, it is currently difficult for the owners and operators of multiple distribution terminals to exchange information about truck drivers who enter and exit their terminals dropping off or picking up cargo. Product pilferage during transfers can result in losses for customers, but it is difficult for terminal owners or operators to exchange information about drivers who may be engaging in or allowing pilferage. Also, drivers who deviate from standard operating procedures at the bay of terminals can create safety issues inside the terminals, but it is difficult for owners or operators of some terminals to obtain information identifying improper driver behaviors and drivers engaging in those improper behaviors. The inability to track driver or vehicle activities can prevent identification of the drivers' overall performance across terminals. The lack of stock reconciliation can reduce transparency to customers, particularly when those customers have products that are stored in commingling tanks and where multiple customers' products can be stored in the same tank.

Figure 4:
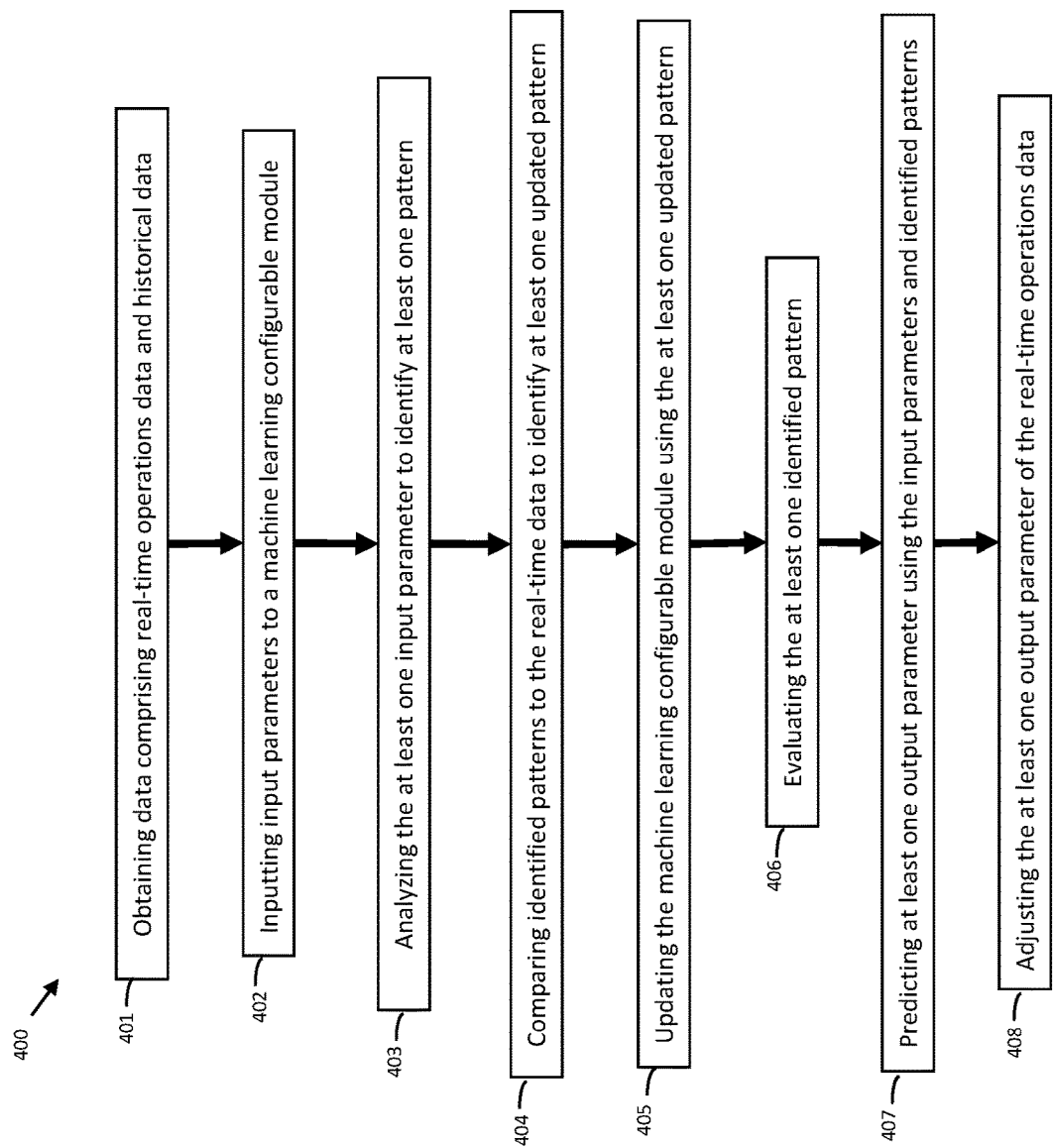
FIG. 4 illustrates an example method for using machine learning-based self-based adaptive system in accordance with this disclosure.

As shown in FIG. 4 data comprising real-time operations data and historical data stored in a local database or at a cloud-server is obtained in step 401. The data relating to at least one input parameter of the at least one terminal station where the input parameter can be at least one of shipping timing, loading/unloading information, driver information, vehicle information, source/destination information or cargo information. The at least one input parameter is fed to a machine learning configurable module of the machine learning-based self-adaptive system in step 402. The at least one input parameter is analyzed using dynamic machine learning models and algorithms to identify at least one pattern to each of the at least one input parameter at step 403. The machine learning configurable module is designed to support supervised and unsupervised learning algorithms. The supervised and unsupervised learning algorithms are user configurable. Supervised learning is a process of the machine learning algorithm that uses training data in a form consisting of an input object and a desired output value. Supervised learning algorithms analyze the training data and maps input variables to an output variable. The supervised learning algorithms infer a mapping function from the input to the output, which can be used to predict the output variables for the new data. Unsupervised learning is a process of the machine learning algorithm used to draw inferences from datasets that consist of input data without labeled responses. The unsupervised learning method models the underlying or hidden patterns, groupings and distributions in the data in order to learn more about the data. The most common unsupervised learning method is cluster analysis. In an example, the supervised and unsupervised learning algorithms can be multiple linear regression and random forest classification algorithms. The machine learning configurable module identifies at least one pattern to each of the input parameters using at least one of multiple linear regression and random forest classification algorithms of the machine learning models.

The obtained real-time operational data is compared with the at least one identified pattern in step 404 to identify at least one updated pattern. The machine learning configurable module is updated using the at least one updated pattern of step 405. The machine learning models continue to learn from the real-time data and continue to update the machine learning models. Real-time data is continuously stored into the historical database at predefined intervals during the real-time operation of the terminal. In one embodiment of the disclosure, the entirety of the real-time data is fed to the trained prediction model to get actionable insights. Accordingly, the machine learning models continue to be updated with the revised patterns and actionable insights with respect to each input parameter during real-time operations.

The at least one identified pattern is evaluated against the real-time operations data obtained from the terminal station at step 406. At least one output parameter is predicted based on the at least one input parameter and the at least one identified pattern against the real-time operations in step 407. The prediction model can be machine leaning models which provide actionable insights. The insights are fed into the real-time data to drive corrective actions to improve the end-to-end terminal operational efficiency and avoid potential failures, thus improving the revenue of the terminal. The at least one output parameter of the real-time operations data is adjusted in step 408 providing the corrective action to at least one output parameter against real-time operations data based on the prediction and insights.

Figure 5:
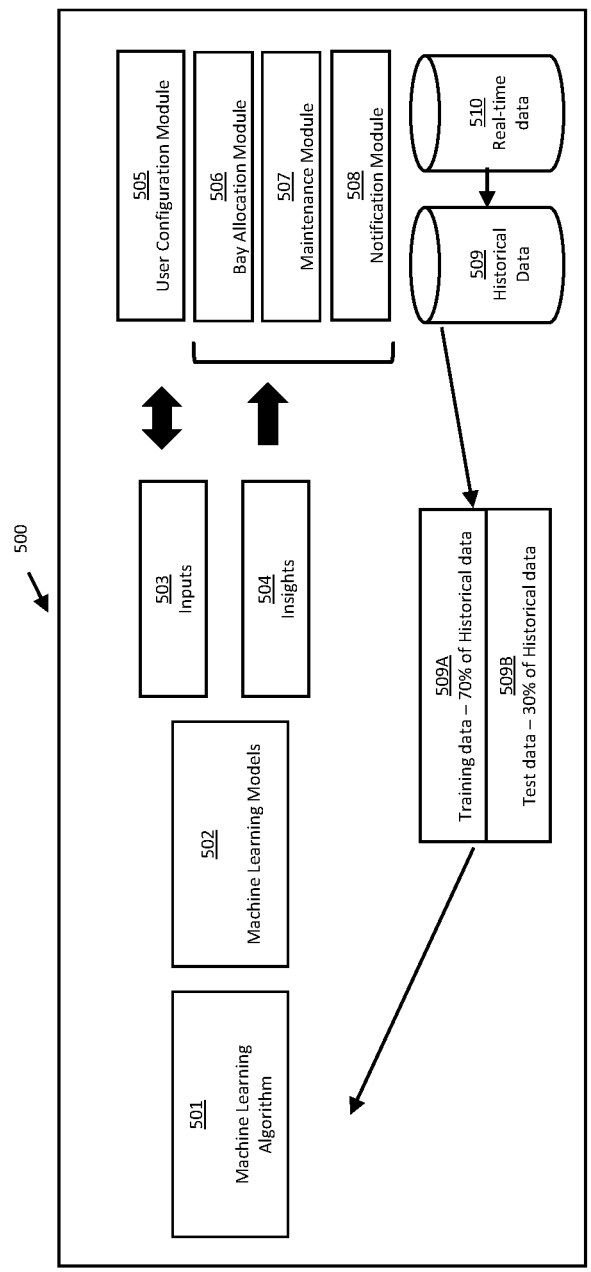
FIG. 5 illustrates an example functional architecture of a machine learning configurable module for using machine learning models in accordance with this disclosure.

FIG. 5 illustrates an example of the present disclosure where a machine learning configurable module 500 includes a machine learning algorithm 501, machine learning models 502, a user configurable module 505, a bay allocation module 506, a maintenance module 507 and a notification module 508. The user using the user configurable module 505 provides input 503 to the machine learning models 502 for desired changes or insights 504. The insights 504 are predictive changes based on the inputs 503 configured in the user configurable module 505. The insights are fed to the bay allocation module 506, the maintenance module 507 and the notification module 508. The bay allocation module 506 is designed to provide instruction as recommended correction actions to make changes in allocation/reallocation of the bays to improve the overall efficiency of the terminal. The maintenance module 507 is designed to provide any maintenance instruction for faulty equipment, assets, or leaking of the product during the terminal operation. The notification module 508 is designed to provide any alarm or alert in an event of any emergency during the terminal operation.

The machine learning configurable module 500 self-learns from periodic analytics using historical data 509 and real-time data 510 of the terminal operations as shown in step 402 of FIG. 4. At least one input parameter is fed to the machine learning configurable module 500 of the machine learning-based self-adaptive system and using the historical data 509 and the real-time data 510, module 500 builds the machine learning models 502 to provide actionable insights 504. The insights 504 are fed to the real-time data to drive corrective actions which improves the end-to-end terminal operational efficiency and avoids potential failure, thus improving the efficiency of the terminal.

The machine learning configurable module 500 analyzes the at least one input parameter using at least one multiple linear algorithm of the machine learning models 502 as shown in step 403 of FIG. 4. In an embodiment, the multiple linear algorithms may include multiple linear regression and random forest classification algorithms, Nearest Neighbor, Support Vector Machine, Naïve Bayes, Decision Trees. The at least one input parameter is analyzed using dynamic machine learning models and a multiple linear algorithm to identify at least one pattern to each of the at least one input parameter. The machine learning configurable module 500 identifies at least one pattern to each of the input parameters.

As shown in FIG. 5, Training data 509A is a first subset of the historical data 509 that is used to train the machine learning models 502. The training data 509A is fed into the machine learning algorithm 501 to generate the machine learning models 502. The percentage of the training data 509A used for training the machine learning model models and the frequency of training used by the machine learning models is configurable by the terminal operator. In an embodiment of the disclosure, 70% of the historical data 509 can be used as training data 509A for training the machine learning models 502.

Further, as shown in FIG. 5, Test data 509B is a second subset of the historical data 509. The test data 509B can be validation data that is fed into the machine learning models 502 to determine the accuracy of the trained model. The percentage of the test data 509B used for test data is configurable by the terminal operator. In an embodiment of the disclosure, 30% of the historical data 509 can be used for validating the machine learning models 502.

In FIG. 5, when the machine learning models 502 are deployed, real-time data 510 is streamed into the machine learning models 502 for predictions and to improve accuracy. The machine learning models 502 may continue to learn from the streamed real-time data 510 and continue to update the machine learning models 502 as shown in step 404 and 405 of FIG. 4. The machine learning models 502 compare the real-time operational data with the at least one identified pattern to identify at least one updated pattern to update the machine learning configurable module using the at least one updated pattern. Real-time data 510 may be stored into the historical database at predefined interval during the real-time operation of the terminal. In an embodiment of the disclosure, the entire amount of real-time data 510 may be fed to the trained prediction model to generate actionable insights.

The machine learning models 502 of the machine learning configurable module 500 are designed to support the supervised and unsupervised learning algorithms. The supervised and unsupervised learning algorithms are user configurable. In an example, the supervised and unsupervised learning algorithms can be multiple linear regression and random forest classification algorithms.

The machine learning algorithms 501 in association with the machine learning models 502 evaluate the identified pattern against the real-time operations data and predict at least one output parameter including bay waiting time, loading time, and end-to-end shipment time for each shipment. As is shown in step 406 and 407 the at least one identified pattern is evaluated against the real-time operations data to predict at least one output parameter based on the at least one input parameter and the at least one identified pattern. Further, the machine learning models 502 may predict other output parameters which affect the throughput of the terminal. The other output parameters can be used for terminal operation planning to improve the terminal efficiency.

The machine learning models 502 provide actionable insights based on the prediction of the at least one output parameter. The insights are fed the real-time data to drive corrective actions to improve the end-to-end terminal operational efficiency. The adjustment of the at least one output parameter based on the actionable insights as shown in step 408 of FIG. 4 that the at least one output parameter of the real-time operations data is adjusted using corrective action recommendations against the real-time operations data based on the prediction and insights.

In an embodiment of the present disclosure, determining output variables for at least one selective output parameter is achieved by computing at least one input variable related to an input parameter. The following timing related output variables for at least one output parameter are computed from at least one input variable related to the input parameters:

a. Bay-Waiting-Time can be computed using at least one input variable related to bay timing including bay exit-time of a vehicle ($V_{XT}$) and bay entry-time of the vehicle ($V_{ET}$)

Bay-Waiting-Time=$V_{XT}-V_{ET}$ b. Vehicle-Loading-Time can be computed using at least one input variable related to vehicle loading timing including Vehicle loading completion time ($V_{LCT}$) and Vehicle loading start time ($V_{LST}$)

Vehicle-Loading-Time=$V_{LCT}-V_{LST}$ c. End-to-End-Shipment-Time can be computed using at least one input variable related to vehicle shipment timing including vehicle exit-time from the terminal ($V_{SXT}$) and Vehicle entry-time from the terminal ($V_{SET}$).

End-to-End-Shipment-Time=$V_{SXT}-V_{SET}$

In an embodiment of the present disclosure, the training of the machine learning models 502 uses a multiple linear regression algorithm that is fed with two or more inputs parameters to the machine learning configurable module 500 that selects at least one output parameter. The input parameters are included in the historical data 509 and the real-time data 510 used for training the machine learning models 502. Training of the machine learning models is provided by analyzing the correlation between all the input parameters. The machine learning models 502 provides response to the selected output parameter with an output variable. Such as the output variable corresponding to loading and shipment timings, that is typically based on input parameters that use one or more input variables including current and historical loading and shipping timings.

The present disclosure consists of a multiple linear regression model with n predictor variables x1, x2, . . . , xn and a response Y, $Y=\beta 0 \beta 1 x1 + \beta 2 x2 + \ldots \beta n xn$ and computes the optimal values of the regression coefficients β0, β1, β2, . . . , βn so that difference between the actual and predicted output value is zero or very minimum.

Y=End-to-End Shipment Time
X1=Driver Id
X2=Finished Product Id
X3=Product Quantity
X4=Bay Id
X5=Vehicle Id
X6=Vehicle Type
X7=Blend type Gradient descent optimization algorithm is used to find the values of regression coefficients β0, β1, β2, . . . , βn to minimize the prediction error.

$$J(\theta_0, \theta_1) = \frac{1}{2m} \sum_{i=1}^{m} (h_\theta(x^{(i)} - y^{(i)})^2$$

Cost Function:
Goal:

$$\min_{\theta_0, \theta_1} J(\theta_0 \cdot \theta_1)$$

Gradient Decent Algorithm
Repeat Until Convergence

{

$$\theta_j := \theta_j - \alpha \frac{\partial}{\partial \theta_j} J(\theta_0, \theta_1)$$

(for $j = 1$ and $j = 0$)

}

In an embodiment of the present disclosure, the output parameter may be end-to-end shipment time, generated using the machine learning models 502 based on the terminal operation data shown as below:

Predicted End-to-End Shipment Time=β0+
(β1*DriverId)+(β2*Finished Product ID)+
(β3*Bay ID)+(β4*Product Quantity)+
(β5*Vehicle Type)+β$n$(Regression Coefficient
for nth input)*$xn$(nth feature input)

In the above example, the data related to the driver, finished product and bay provides the overall shipment time. However, the input parameters may vary from terminal to terminal based on each of the terminal operations performance and historical data.

There are following specific insights and corrective actions recommendation based on the analysis of the machine learning models:

To predict the end-to-end shipment time for all the shipments planned in a given day accurately, computation of the input variable related to timing for bay allocations is required. The corrective action recommendation can be re-planning of bay allocations for shorter shipment time.

In a specific situation where a particular driver has a pattern of taking excessive time for loading the products which results in an overall delay in end-to-end shipment time the insight identified may be due to a of lack of training or awareness of procedures on the part of the driver. For example, the driver may be using the equipment incorrectly. The corrective action recommended may be to provide training for the driver as to proper use of the equipment or perhaps to inform the carrier company of the observation.

In another situation where loading and unloading of a specific product from a particular bay has a pattern of causing an overall delay in end-to-end shipment time. The insights generated may be indicate faulty equipment in that particular bay. The corrective action recommended could be to initiate maintenance operations on the faulty equipment.

In a yet another situation where loading and unloading of a particular product has pattern of causing delay. The insights generated bay indicate a lack of supply or insufficient capacity that a specific bay for loading that particular product. The corrective action recommended could be, to increase the supply and storage capacity for the particular product In an embodiment, a driver ID input parameter can be a key predictor. The pattern derived from the machine learning models 502 of the driver ID can provide a clear insight that one particular driver always takes a longer time than the average time for loading or unloading of the product, causing delay in the end-to-end shipment.

In another embodiment, a finished product ID can be another key predictor as one of the input parameters generated for the machine learning models 502. The finished product ID parameter provides insight to the loading of one particular finished product, regardless of the driver ID. This provides insight if a particular driver always takes a longer than the average time for loading/unloading a particular finished product.

In an embodiment, the machine learning algorithm 501 may use a random forest classification algorithm to predict a failure in equipment in the terminal. The failure prediction for terminal equipment can be an effective approach to improve reliability and terminal operational efficiency. Therefore, in the present embodiment, the machine learning configurable module 500 provides failure prediction of the terminal equipment based on a part-voting random forest classification algorithm, which differentiates prediction of failures in a coarse-grained manner. The machine learning model 502 is trained using historical data relating to the equipment failure and tested with the real-time terminal operation.

In another embodiment, the machine learning configurable module 500 examines patterns using the machine learning model 502, including patterns of shipments that need at least one of manual intervention or forced closure, patterns of abnormal usage of the terminal assets, patterns for unethical usage of loading and weighing devices, and patterns for supply demand and inventor management.

The machine learning models 502 provides insights and recommends at least one corrective action based on insights identified using the machine learning algorithms 501. Such as when there may be problems in at least one of equipment, a specific bay or in a way that a driver performs a loading/unloading process. The insights can be a combination of a driver, finished product type, and the bay, which would prompt a need for a corrective manual intervention. The recommended corrective actions for an impending equipment failure can be informing the terminal supervisor to initiate the maintenance operations on the faulty equipment. When the insight corresponds to a pattern of a particular driver using the terminal assets abnormally, then the recommended corrective actions can be informing the terminal supervisor to monitor a specific driver, informing the cargo company about behavior, or blocking the entry of the driver. Further, when the insight corresponds to a pattern of a particular drivers unethical use of loading/unloading of a particular product, the recommended corrective action can be informing the terminal supervisor to monitor the specific driver, informing the cargo company employing the driver, or having the driver undergo training.

Figure 6:
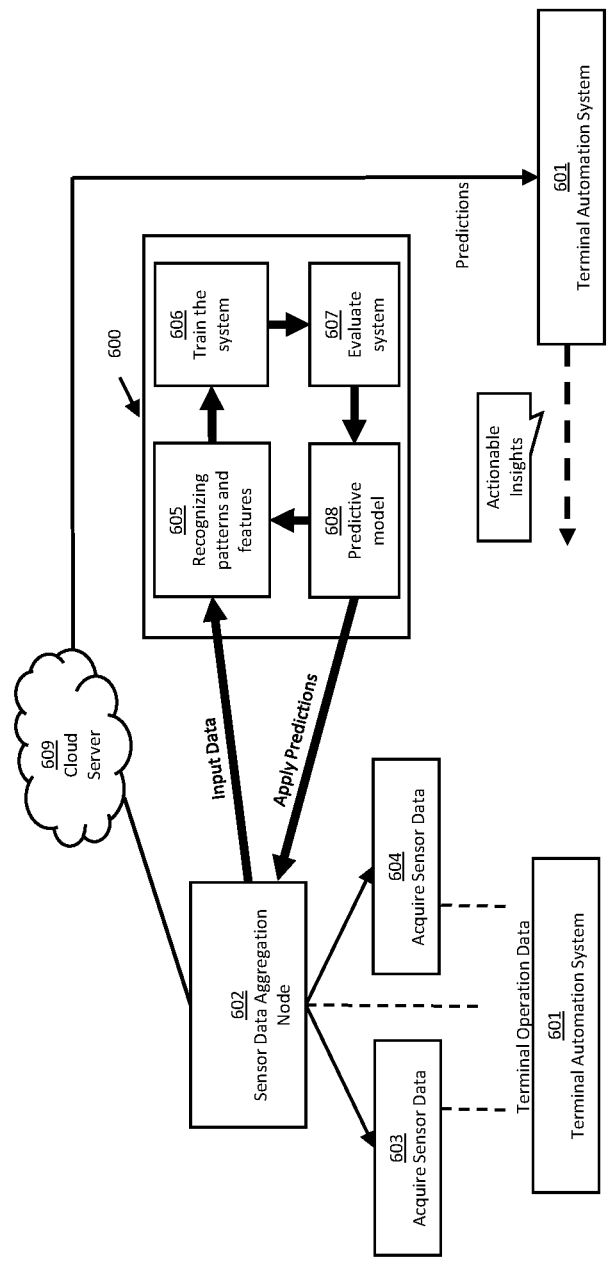
FIG. 6 illustrates another example of functional architecture of a machine learning models on Cloud Server and the terminal automation system on premises in accordance with this disclosure.

FIG. 6 shows a specific embodiment of the present disclosure that includes machine learning models 600 located on a cloud server 609. The cloud server is located remote from the terminal automation system 601 which is located on premises. The machine learning algorithms train machine learning models 600. The machine learning models 600 receive data from the sensor data aggregation node 602. The machine learning models 600 recognize patterns or features 605 from the data provided by aggregation node 602 and provide training 606 to the machine learning models 600. The Evaluation systems 607 evaluates the identified patterns against the real-time operations data during terminal operations and predicts at least one output parameter using prediction model 608. The output parameter is then sent to the terminal automated system 601. The terminal automated system 601 uses the prediction and provides actionable insights to the sensor data aggregation nodes of the terminal facility. The prediction and actionable insights are used to adjust the output parameter of the real-time data to drive corrective actions that improve the end-to-end terminal operational efficiency.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or.

The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

SPECIFIC EMBODIMENTS

While the following is described in conjunction with specific embodiments, it will be understood that this description is intended to illustrate and not limit the scope of the preceding description and the appended claims.

A first embodiment of the disclosure is a method for improving the real-time operation of at least one terminal station in an industrial facility using a machine learning-based self-adaptive system comprising (a) obtaining, from the at least one terminal station, data comprising real-time operations data and historical data stored in a local database or at a cloud-storage, the data relating to at least one input parameter of the at least one terminal station; (b) inputting the at least one input parameter to a machine learning configurable module of the machine learning-based self-adaptive system; (c) analyzing the at least one input parameter using dynamic machine learning models and algorithms to identify at least one pattern to each of the at least one input parameter; (d) evaluating the at least one identified pattern against the real-time operations data obtained from the at least one terminal station; (e) predicting at least one output parameter based on the at least one input parameter and the at least one identified pattern against the real-time operations; and (f) adjusting the at least one output parameter of the real-time operations data. An embodiment of the disclosure is one, any or all of prior embodiments in this paragraph up through the first embodiment in this paragraph further comprising comparing the obtained real-time operational data with the at least one identified pattern to identify at least one updated pattern; and updating the machine learning configurable module using the at least one updated pattern. An embodiment of the disclosure is one, any or all of prior embodiments in this paragraph up through the first embodiment in this paragraph, wherein the at least one pattern comprises one or more of a pattern of time for movement of vehicle or a particular product, a pattern for causing overall delay in end-to-end shipment time, a pattern of loading/ unloading of the particular product, a pattern of usage of a type of the vehicle, a pattern of usage of equipment corresponding to the particular product, a pattern of usage of a specific bay for the particular product, and a pattern of driver choice corresponding to the bay, the equipment, or the vehicle. An embodiment of the disclosure is one, any or all of prior embodiments in this paragraph up through the first embodiment in this paragraph, wherein the dynamic machine learning models and algorithms comprises at least one of a supervised learning classification or regression algorithms. An embodiment of the disclosure is one, any or all of prior embodiments in this paragraph up through the first embodiment in this paragraph, wherein the at least one output parameter includes at least one of bay-waiting time, vehicle loading time, end-to-end shipment time. An embodiment of the disclosure is one, any or all of prior embodiments in this paragraph up through the first embodiment in this paragraph, wherein the at least one input parameters of the bulk fuel terminal operation selected from one or more of order, shipment, vehicle, product, blends, driver, carrier company, terminal bay, schedule, or terminal equipment. An embodiment of the disclosure is one, any or all of prior embodiments in this paragraph up through the first embodiment in this paragraph, wherein the supervised learning classification or regression algorithms predict failure of at least one of equipment or asset in the terminal station. An embodiment of the disclosure is one, any or all of prior embodiments in this paragraph up through the first embodiment in this paragraph, wherein the data is associated with one or more products stored in or transferred through the terminal station during the terminal operation; and the at least one identified pattern indicates at least a portion of the one or more products has been loaded or unloaded from the terminal station. An embodiment of the disclosure is one, any or all of prior embodiments in this paragraph up through the first embodiment in this paragraph, wherein the data is associated with at least one of a vehicle used to transport one or more products during the terminal operation, or a driver of the vehicle; and the at least one identified pattern provides information about the vehicle or the driver. An embodiment of the disclosure is one, any or all of prior embodiments in this paragraph up through the first embodiment in this paragraph, wherein the information about the vehicle or the driver comprises expected and actual arrival times of the vehicle; an indication whether the driver followed at least one standard operating procedure during a pick-up or delivery of one or more products during the terminal operation; or a total time spent by the driver during the pick-up or delivery of the one or more products. An embodiment of the disclosure is one, any or all of prior embodiments in this paragraph up through the first embodiment in this paragraph, wherein the at least one output parameter identifies at least one quantity of one or more products to be loaded from the terminal station, at least one quantity of the one or more products that was expected to be load from the terminal station, at least one quantity of the one or more products to be unloaded from the terminal station, and at least one quantity of the one or more products that was expected to be unload from the terminal station. An embodiment of the disclosure is one, any or all of prior embodiments in this paragraph up through the first embodiment in this paragraph, wherein the machine learning configurable module is configured to notify using a notification module of the machine learning-based self-adaptive system, wherein the notification module provides an alert based on the adjustment of the at least one output parameter during the real-time operations data. An embodiment of the disclosure is one, any or all of prior embodiments in this paragraph up through the first embodiment in this paragraph, wherein the machine learning configurable system module is configured to allocate bays using a bay allocation module of the machine learning-based self-adaptive system, wherein the bay allocation module modifies the bay allocation based on the adjustment of the at least one output parameter. An embodiment of the disclosure is one, any or all of prior embodiments in this paragraph up through the first embodiment in this paragraph, wherein the machine learning configurable module is configured to provide maintenance instruction using a maintenance module of the machine learning-based self-adaptive system, wherein the maintenance instruction is based on the adjustment of the at least one output parameter. An embodiment of the disclosure is one, any or all of prior embodiments in this paragraph up through the first embodiment in this paragraph, wherein the real time operational data is sensor data obtained from a sensor aggregation node. A non-transitory machine-readable medium encoded with instructions that, when executed, cause at least one processing device to improve the real-time operation of at least one terminal station in an industrial facility using a machine learning-based self-adaptive system, the at least one processing device (a) obtain, from the at least one terminal station, data comprising real-time operations data and historical data stored in a local database or at a cloud-storage, the data relating to at least one input parameter of the at least one terminal station; (b) input the at least one input parameter to a machine learning configurable module of the machine learning-based self-adaptive system; (c) analyze the at least one input parameter by the machine learning configurable module using dynamic machine learning models and algorithms to identify at least one pattern to each of the at least one input parameter; (d) evaluate the at least one identified pattern against the real-time operations data obtained from the at least one terminal station; (e) predict at least one output parameter based on the at least one input parameter and the at least one identified pattern against the real-time operations; and (f) adjust the at least one output parameter of the real-time operations data. An embodiment of the disclosure is one, any or all of prior embodiments in this paragraph up through the first embodiment in this paragraph, wherein the at least one pattern comprises one or more of a pattern of time for movement of vehicle or a particular product, a pattern for causing overall delay in end-to-end shipment time, a pattern of loading/unloading of the particular product, a pattern of usage of a type of the vehicle, a pattern of usage of equipment corresponding to the particular product, a pattern of usage of a specific bay for the particular product, and a pattern of driver choice corresponding to the bay, the equipment, or the vehicle. A machine learning-based self-adaptive system for improving the real-time operation of at least one terminal station in an industrial facility comprising a memory device arranged to receive and store real time operations data from a sensor data aggregation node, the real time operations data relating to at least one input parameter of the at least one terminal station; a database containing historical data obtained from the sensor data aggregation node, the historical data relating to the at least one input parameter of the terminal operation of the at least one terminal station; a machine learning module including one or more processors, the machine learning module coupled to the memory device and database and arranged to obtain the real-time operations data from the memory device and the historical data from the database for processing by the one or more processors; the one or more processors configured to input the at least one input parameter to a machine learning configurable module of the machine learning-based self-adaptive system; analyze the at least one input parameter by the machine learning configurable module using dynamic machine learning models and algorithms to identify at least one pattern to each of the at least one input parameter; evaluate the at least one identified pattern against the real-time operations data obtained from the at least one terminal station; predict at least one output parameter based on the at least one input parameter and the at least one identified pattern against the real-time operations; and adjust the at least one output parameter of the real-time operations data. An embodiment of the disclosure is one, any or all of prior embodiments in this paragraph up through the first embodiment in this paragraph, wherein the at least one pattern comprises one or more of a pattern of time for movement of vehicle or a particular product, a pattern for causing overall delay in end-to-end shipment time, a pattern of loading/unloading of the particular product, a pattern of usage of a type of the vehicle, a pattern of usage of equipment corresponding to the particular product, a pattern of usage of a specific bay for the particular product, and a pattern of driver choice corresponding to the bay, the equipment, or the vehicle.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A method for improving real-time operation of at least one terminal station in an industrial facility using a machine learning-based self-adaptive system, the method comprising:
   (a) obtaining, from the at least one terminal station, data comprising real-time operations data that relates to sensor data from a sensor data aggregation node of the at least one terminal station and historical data stored in a local database or at a cloud-storage, the data relating to at least one input parameter of the at least one terminal station;
   (b) inputting the at least one input parameter to a machine learning configurable module of the machine learning-based self-adaptive system;
   (c) analyzing the at least one input parameter by the machine learning configurable module using dynamic machine learning models and algorithms to identify at least one pattern to each of the at least one input parameter,
   wherein the machine learning configurable module is configured to allocate bays of the at least one terminal station using a bay allocation module of the machine learning-based self-adaptive system,
   wherein the dynamic machine learning models and algorithms comprise at least one of a supervised learning classification or regression algorithms, and
   wherein the supervised learning classification or regression algorithms predict failure of at least one of equipment or asset in the industrial facility;
   (d) recognizing the at least one pattern from the data provided by the sensor data aggregation node and providing training to the machine learning models and algorithms based on the at least one pattern;
   (e) evaluating the at least one pattern against the real-time operations data obtained from the at least one terminal station;
   (f) predicting at least one output parameter based on the at least one input parameter and the at least one pattern against the real-time operations;
   (g) providing actionable insights using at least one module including the bay allocation module, a maintenance module and a notification module of the machine learning configurable module;
   (h) sending the actionable insights to the sensor data aggregation node of the at least one terminal station;
   (i) adjusting the at least one output parameter of the real-time operations data using the actionable insights; and
   (j) modifying, using the bay allocation module, the bays allocation based on the adjustment of the at least one output parameter.

2. The method of claim 1 further comprising:
comparing the obtained real-time operations data with the at least one pattern to identify at least one updated pattern; and
updating the machine learning configurable module using the at least one updated pattern.

3. The method of claim 1, wherein the at least one pattern comprises one or more of:
   a pattern of time for movement of vehicle or a particular product,
   a pattern for causing overall delay in end-to-end shipment time,
   a pattern of loading/unloading of the particular product,
   a pattern of usage of a type of the vehicle,
   a pattern of usage of equipment corresponding to the particular product,
   a pattern of usage of a specific bay for the particular product, and
   a pattern of driver choice corresponding to the bay, the equipment, or the vehicle.

4. The method of claim 1, wherein the at least one output parameter includes at least one of bay-waiting time, vehicle loading time, end-to-end shipment time.

5. The method of claim 1, wherein the at least one input parameter associated with a bulk fuel terminal operation is selected from one or more of: order, shipment, vehicle, product, blends, driver, carrier company, terminal bay, schedule, or terminal equipment.

6. The method of claim 1, wherein:
the data is associated with one or more products stored in or transferred through the at least one terminal station during a terminal operation; and
the at least one pattern indicates at least a portion of the one or more products loaded or unloaded from the at least one terminal station.

7. The method of claim 1, wherein:
the data is associated with at least one of: a vehicle used to transport one or more products during a terminal operation, or a driver of the vehicle; and
the at least one pattern provides information about the vehicle or the driver.

8. The method of claim 7, wherein the information about the vehicle or the driver comprises:
expected and actual arrival times of the vehicle;
an indication whether the driver followed at least one standard operating procedure during a pick-up or delivery of one or more products during the terminal operation; or
a total time spent by the driver during the pick-up or delivery of the one or more products.

9. The method of claim 1, wherein: the at least one output parameter identifies:
(i) at least one quantity of one or more products to be loaded from the at least one terminal station,
(ii) at least one quantity of the one or more products that was expected to be load from the at least one terminal station,
(iii) at least one quantity of the one or more products to be unloaded from the at least one terminal station, and
(iv) at least one quantity of the one or more products that was expected to be unload from the at least one terminal station.

10. The method of claim 1, wherein the machine learning configurable module is configured to notify using the notification module of the machine learning-based self-adaptive system, and wherein the notification module provides an alert based on the adjustment of the at least one output parameter during the real-time operations data.

11. The method of claim 1, wherein the machine learning configurable module is configured to provide maintenance instruction using the maintenance module of the machine learning-based self-adaptive system, and wherein the maintenance instruction is based on the adjustment of the at least one output parameter.

12. A non-transitory machine-readable medium encoded with instructions that, when executed, cause at least one processing device to improve real-time operation of at least one terminal station in an industrial facility using a machine learning-based self-adaptive system, the at least one processing device configured to:
(a) obtain, from the at least one terminal station, data comprising real-time operations data that relates to sensor data from a sensor data aggregation node of the at least one terminal station and historical data stored in a local database or at a cloud-storage, the data relating to at least one input parameter of the at least one terminal station;
(b) input the at least one input parameter to a machine learning configurable module of the machine learning-based self-adaptive system;
(c) analyze the at least one input parameter by the machine learning configurable module using dynamic machine learning models and algorithms to identify at least one pattern to each of the at least one input parameter, wherein the machine learning configurable module is configured to allocate bays of the at least one terminal station using a bay allocation module of the machine learning-based self-adaptive system,
wherein the dynamic machine learning models and algorithms comprise at least one of a supervised learning classification or regression algorithms, and
wherein the supervised learning classification or regression algorithms predict failure of at least one of equipment or asset in the industrial facility;
(d) recognize the at least one pattern from the data provided by the sensor data aggregation node and provide training to the machine learning models and algorithms based on the at least one pattern;
(e) evaluate the at least one pattern against the real-time operations data obtained from the at least one terminal station;
(f) predict at least one output parameter based on the at least one input parameter and the at least one pattern against the real-time operations;
(g) provide actionable insights using at least one module including the bay allocation module, a maintenance module and a notification module of the machine learning configurable module;
(h) send the actionable insights to the sensor data aggregation node of the at least one terminal station;
(i) adjust the at least one output parameter of the real-time operations data using the actionable insights; and
(j) modify, using the bay allocation module, the bays allocation based on the adjustment of the at least one output parameter.

13. The non-transitory machine-readable medium of claim 12, wherein the at least one pattern comprises one or more of:
a pattern of time for movement of vehicle or a particular product,
a pattern for causing overall delay in end-to-end shipment time,
a pattern of loading/unloading of the particular product,
a pattern of usage of a type of the vehicle,
a pattern of usage of equipment corresponding to the particular product,
a pattern of usage of a specific bay for the particular product, and
a pattern of driver choice corresponding to the bay, the equipment, or the vehicle.

14. A machine learning-based self-adaptive system for improving real-time operation of at least one terminal station in an industrial facility, the system comprising:
a memory device arranged to receive and store real time operations data from a sensor data aggregation node, the real time operations data relating to at least one input parameter of the at least one terminal station;
a database containing historical data obtained from the sensor data aggregation node, historical data relating to the at least one input parameter of the terminal operation of the at least one terminal station;
a machine learning module including one or more processors, the machine learning module coupled to the memory device and database and arranged to obtain the real-time operations data from the memory device and the historical data from the database for processing by the one or more processors;
the one or more processors configured to:
input the at least one input parameter to a machine learning configurable module of the machine learning-based self-adaptive system;

analyze the at least one input parameter by the machine learning configurable module using dynamic machine learning models and algorithms to identify at least one pattern to each of the at least one input parameter, wherein the machine learning configurable module is configured to allocate bays of the at least one terminal station using a bay allocation module of the machine learning-based self-adaptive system, wherein the dynamic machine learning models and algorithms comprise at least one of a supervised learning classification or regression algorithms, and wherein the supervised learning classification or regression algorithms predict failure of at least one of equipment or asset in the industrial facility;

recognize the at least one pattern from the data provided by the sensor data aggregation node and provide training to the machine learning models and algorithms based on the at least one pattern;

evaluate the at least one pattern against the real-time operations data obtained from the at least one terminal station;

predict at least one output parameter based on the at least one input parameter and the at least one pattern against the real-time operations;

provide actionable insights using at least one module including the bay allocation module, a maintenance module and a notification module of the machine learning configurable module;

send the actionable insights to the sensor data aggregation node of the at least one terminal station;

adjust the at least one output parameter of the real-time operations data using the actionable insights; and modify, using the bay allocation module, the bays allocation based on the adjustment of the at least one output parameter.

15. The system of claim 14, wherein the at least one pattern comprises one or more of:
- a pattern of time for movement of vehicle or a particular product,
- a pattern for causing overall delay in end-to-end shipment time,
- a pattern of loading/unloading of the particular product,
- a pattern of usage of a type of the vehicle,
- a pattern of usage of equipment corresponding to the particular product,
- a pattern of usage of a specific bay for the particular product, and
- a pattern of driver choice corresponding to the bay, the equipment, or the vehicle.

\* \* \* \* \*